United States Patent [19]

Murakami et al.

[11] Patent Number: 4,912,179
[45] Date of Patent: Mar. 27, 1990

[54] BISPHENOL A EPOXY RESIN MIXTURES WITH AROMATIC DI-SECONDARY AMINE

[75] Inventors: Shinkichi Murakami; Osamu Watanebe, both of Iruma; Sadahisa Wada, Kamifukuoka; Makoto Miyazaki, Sakato; Hiroshi Inoue, Iruma, all of Japan

[73] Assignee: Toa Nenryo Kogyo Kabushiki Kaisha, Japan

[21] Appl. No.: 329,890

[22] Filed: Mar. 28, 1989

[30] Foreign Application Priority Data

Mar. 30, 1988 [JP] Japan .................................. 63-77325
Apr. 29, 1988 [JP] Japan ................................ 63-108861
Apr. 29, 1988 [JP] Japan ................................ 63-108862

[51] Int. Cl.$^4$ ...................... C08L 63/02; C08G 59/50
[52] U.S. Cl. .................................... 525/524; 525/504; 525/526
[58] Field of Search ........................ 525/524, 526, 504

[56] References Cited

U.S. PATENT DOCUMENTS 3,560,388  2/1971  Higashi ............................... 525/524
3,957,716  5/1976  Weldy ................................ 525/524
4,040,993  6/1977  Elbling et al. ...................... 525/524

FOREIGN PATENT DOCUMENTS 51-82326   7/1976  Japan ................................. 525/524
61-188478  8/1986  Japan ................................. 525/524
 223312   11/1968  U.S.S.R. ............................. 525/524

Primary Examiner—John C. Bleutge
Assistant Examiner—Robert E. Sellers, II
Attorney, Agent, or Firm—Lorusso & Loud

[57] ABSTRACT

A new thermocurable composition is disclosed which comprises a Bisphenol A-type epoxy resin having a number average molecular weight of 650–1300, 10–40% by weight of the Bisphenol A-type epoxy resin having an epoxy equivalent of 180–195; and a curing agent capable of cross-linking the epoxy resin. The curing agent is preferably a compound represented by the following general formula:

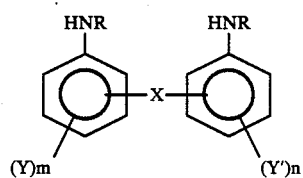

wherein X is —$CR_1R_2$—, —CO—, —COO—, —$SO_2$—, —SO—, —S—, —O—, —$NR_1$—, —$SiR_1R_2$— or —$POR_1$— where $R_1$ and $R_2$ each stands for hydrogen, a lower alkyl or a phenyl; Y and Y' each stands for hydrogen, a lower alkyl or an electron attractive group; R is a lower alkyl; and m and n each is an integer of 1–4, or a mixture thereof with a primary amine, a phenolic compound or an acid anhydride.

11 Claims, No Drawings

BISPHENOL A EPOXY RESIN MIXTURES WITH AROMATIC DI-SECONDARY AMINE

This invention relates generally to a thermocurable epoxy resin composition and, more specifically, to a thermocurable composition containing a specific Bisphenol A-type epoxy resin and affording a cured resin product excellent in hardness, modulus, heat resistance and toughness.

Because of their excellent reistance to heat and chemicals and excellent hardness and modulus, epoxy resins have been utilized for a wide variety of applications. For example, epoxy resins are known to be used as a matrix material for fiber-reinforced composite plastics. One problem associated with the use of an epoxy resin as a matrix of a fiber-reinforced plastic is directed to its low toughness. For example, Japanese Unexamined Patent Application (Tokkyo Kokai) No. 62-127,317 discloses an epoxy resin composition useful for the formation of a prepreg matrix resin, which includes a Bisphenol A-type epoxy resin having an epoxy equivalent of 2400-3300 and a number average molecular weight of 3750, and a curing agent. While such an epoxy resin composition can give improved moldability, the cured resin obtained therefrom fails to show satisfactory mechanical strength, particularly toughness.

The present invention has been made with the above problem of conventional epoxy resin compositions. In accordance with the present invention there is provided a thermocurable composition comprising:

a Bisphenol A-type epoxy resin having a number average molecular weight of 650-1300, 10-40% by weight of the Bisphenol A-type epoxy resin having an epoxy equivalent of 180-195; and an epoxy resin curing agent capable of cross-linking the epoxy resin.

The thermocurable resin composition according to the present invention can afford a cured product having high modulus, hardness and toughness and excellent resistance to heat and chemicals. Fiber-reinforced plastics containing a matrix resin obtained from such a thermocurable resin composition exhibit improved mechanical strengths such as impact strength, fracture strength, resistance to thermal shock and adhesion. Further, the thermocurable resin composition is excellent in tackiness, drape-formability, flowability and stability so that it is advantageously used for the formation of prepregs.

The present invention will now be described in detail below.

The term "Bisphenol A-type epoxy resin" used herein is intended to refer to an epoxy resin obtained by reaction of Bisphenol A with epichlorohydrin and having as its main ingredient oligomers of the following general formula:

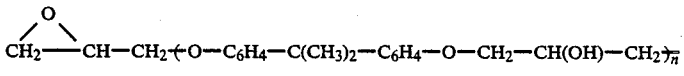

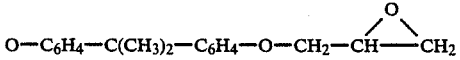

The term "epoxy equivalent", which is also generally called "weight per epoxide equivalent", refers to the weight of the epoxy resin per 1 gram equivalent of the epoxy group contained in the epoxy resin. For example, the epoxy equivalent of the epoxy resin of the above formula in which n is 1 is 312. The Bisphenol A-type epoxy resin to be used in the present invention is a mixture of various different molecular weight oligomers.

It is important that the Bisphenol A-type resin to be used in the present invention have a number average molecular weight of 650-1300 and that the content of that portion of the Bisphenol A-type epoxy resin which has an epoxy equivalent of 180-195 should be 10-40% based on the weight of the Bisphenol A-type epoxy resin.

In case where the number average molecular weight of the Bisphenol A-type epoxy resin to be used in the present invention is lower than 650, the tackiness of the thermocurable resin composition becomes so increased that it becomes difficult to form prepregs. Further, the fluidity of the resin composition becomes so high that it becomes difficult to produce cured products having uniform matrix structures. Too high a number average molecular weight in excess of 1300, on the other hand, is disadvantageous because the tackiness becomes so poor that lamination of prepregs fail to be effected satisfactory. The number average molecular weight of the epoxy resin is preferably 650-1000.

A content of a portion of the Bisphenol A-type epoxy resin, which portion has an epoxy equivalent of 180-195, below 10 weight % based on the Bisphenol A-type epoxy resin is insufficient for imparting suitable tackiness to the thermocurable resin composition, so that lamination of prepregs obtained from the resin composition becomes difficult to perform. On the other hand, when the content of the portion of the Bisphenol A-type epoxy resin having an epoxy equivalent of 180-195 is greater than 40 weight % based on the Bisphenol A-type epoxy resin, the tackiness of the resin composition becomes excessively high to cause the lowering of the processability thereof for the formation of prepregs. Additionally, the fluidity of the resin composition is increased to cause difficulties in obtaining cured product having a uniform matrix structure.

The Bisphenol A-type epoxy resin to be used in the present invention can be obtained by blending two or more commercially available Bisphenol A-type resins. Examples of suitable resins include Epicoat 815, 827, 828, 834, 1001, 1002, 1004 and 1007 (Trademarks of Yuka-Shell Kabushiki Kaisha) whose properties are shown below:

| Epicoat | Epoxy Equivalent | Number Average Molecular Weight |
|---|---|---|
| 815 | 181–191 | 330 |
| 827 | 180–190 | |
| 828 | 184–194 | 380 |
| 834 | 230–270 | 470 |
| 1001 | 450–500 | 900 |
| 1002 | 600–700 | 1060 |
| 1004 | 800–900 | 1600 |
| 1007 | 1750–2200 | 2900 |

The Bisphenol A-type epoxy resin may be obtained by blending a first resin having an epoxy equivalent of 180–195 with a second resin having an epoxy equivalent of greater than 195, the amount and the molecular weight of the second resin being such that the proportion of the first resin is in the range of 10–40% by weight based on the weight of the blend and that the number average molecular weight of the blend is in the range of 650–1300. The first resin may be Epicoat 815, 827, 828 or a mixture thereof while the second resin may be Epicoat 834, 1001, 1002, 1004, 1007 or a mixture thereof.

When an improvement in heat resistance is desired at the sacrifice of toughness, an epoxy resin which is not a Bisphenol A-type epoxy resin can be incorporated into the thermocurable epoxy resin composition. However, the amount of such an additional epoxy resin should not exceed 50% by weight based on the total weight of the Bisphenol A-type epoxy resin and the additional epoxy resin, since otherwise there is caused a considerable reduction in toughness.

Examples of such additional epoxy resins include glycidyl ether-type epoxy resins such as Bisphenol F-type, Bisphenol S-type, novolac type and brominated Bisphenol A-type epoxy resins; alicyclic epoxy resins; glycidyl ester-type epoxy resins; glycidylamine-type epoxy resins; and heterocyclic epoxy resins.

Any curing agent may be used in the present invention. The curing agent is generally used in a schiometric amount with respect to the epoxy resin. Examples of the curing agents include:

(A) Amine curing agent:

(A-1) aliphatic primary amines such as diethylenetriamine, triethylenetetramine, tetraethylenepentamine, dipropylenetriamine, trimethylhexamethylenediamine, a polyether diamine, diethylaminopropylamine, menthendiamine, methaxylylenediamine and 3,9-bis(3-aminopropyl)-2,4,8,10-tetraspiro[5,5]undecane;

(A-2) aromatic primary amines such as methaphenylenediamine, diaminodiphenylmethane, diaminodiphenylsulfone, and aromatic diamine eutectic mixtures;

(A-3) modified amines such as amine adducts and cyanoethylated polyamines;

(A-4) secondary and tertiary amines such as tetramethylguanidine, pyperidine, pyridine, picoline, benzyldimethylamine, 2-(dimethylaminomethyl)phenol; and (A-5) polyamides such as condensation products of a dimer acid with a polyamine;

(B) acid anhydrides:

(B-1) aromatic acid anhydrides such as phthalic anhydride, trimellitic anhydride, ethylene glycol bis(anhydrotrimellitate), glycerol tris(anhydrotrimellitate), pyromellitic anhydride and 3,3',4,4'-benzophenone tetracarboxylic anhydride, (B-2) alicyclic acid anhydrides such as maleic anhydride, succinic anhydride, tetrahydrophthalic anhydride, methyltetrahydrophthalic anhydride, methylnadic anhydride, alkenylsuccinic anhydride, hexahydrophthalic anhydride, methylhexahydrophthalic anhydride, and methylcyclohexene tetracarboxylic anhydride;

(B-3) aliphatic acid anhydrides, halogenated acid anhydrides, polycarboxylic anhydride and chloreside anhydride;

(C) polyamide resins such as N,N'-bis(6-aminohexyl)adipamide;

(D) imidazoles such as 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-undecylimidazolium trimetllitate, 2,4-diamino-6-[2-methylimidazolyl-(1)]-ethyl-S-triazine, 1-dodecyl-2-methyl-3-benzylimidazolium chloride, 2-phenylimidazolium isocyanulate, and 2-phenyl-4-methyl-5-hydroxymethylimidazole;

(E) boron trifluoride-amine complexes;

(F) dicyanodiaminde and its derivatives such as o-tolyl biguanide and α-2,5-dimethylbiguanide;

(G) organic acid hydrazides such as succinic acid hydrazide and adipic acid hydrazide;

(H) diaminomaleonitrile and its derivatives;

(I) melamine and its derivatives such as diallylmelamine;

(J) amine imides;

(K) polyamines;

(L) oligomers such as novolac phenol resins, novolac cresol resins and poly-p-vinylphenols.

When the thermocurable epoxy resin composition of the present invention is to be used for the formation of molded articles such as mechanical parts, the use of diaminodiphenylmethane, diaminodiphenylsulfone and dicyanodiamide as the curing agent is preferred for reasons of obtainability of suitable toughness, heat resistance and machinability.

When the thermocurable epoxy resin composition is intended to be used for a carbon fiber-reinforced prepreg matrix, the use of dicyandiamide, diaminodiphenylmethane and diaminodiphenylsulfone is also preferred for reasons of obtainability of suitable tackiness, drape-formability, flowability, workability and stability.

It is especially preferable to use as the curing agent at least one compound represented by the following general formula (I):

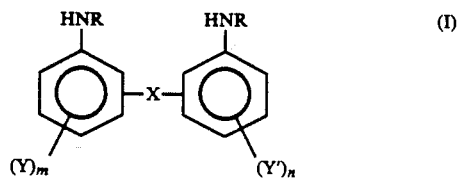

wherein X is —CR$_1$R$_2$—, —CO—, —COO—, —SO$_2$—, —SO—, —S—, —O—, —NR$_1$—, —SiR$_1$R$_2$— or —POR$_1$— where R$_1$ and R$_2$ each stands for hydrogen, a lower alkyl or a phenyl; Y and Y' each stands for hydrogen, a lower alkyl or an electron attractive group; R is a lower alkyl; and m and n each is an integer of 1–4.

Preferably, in the above formula (I), R is an alkyl having 1–3 carbon atoms, X is —CH$_2$—, —SO$_2$—, —CO—, —O—, —C(CH$_3$)$_2$— or —CHC$_6$H$_5$, Y and Y' each is hydrogen, a lower alkyl, a halogen, a nitro group or trifluoromethyl, R$_1$ and R$_2$ each is an alkyl having 1–3 carbon atoms, and m and n each is 1 or 2. Illustrative suitable compounds of the formula (I) are as forlows:

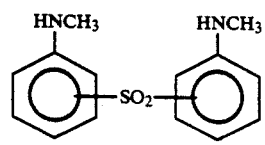

-continued

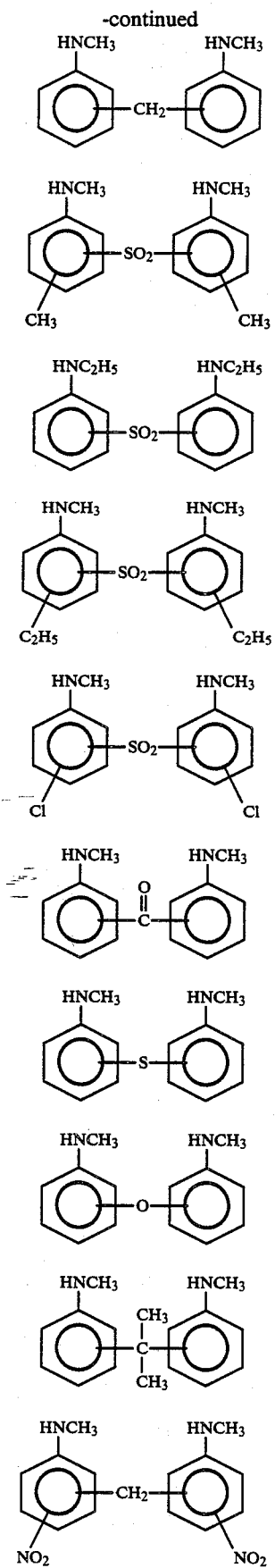

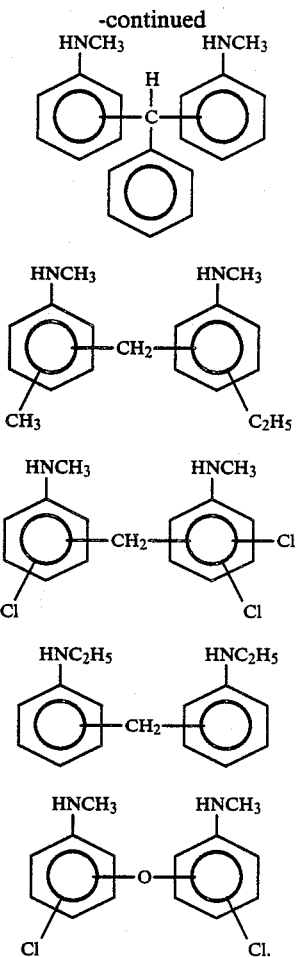

The use of the compound of the formula (I) can give a cured epoxy resin product having an improved toughness. It is desirable to use the compound of the formula (I) in conjunction with another curing agent selected from primary amines such as aliphatic amines, aromatic amines, polyamidoamines and dicyanopolyamides; phenolic compounds such as bisphenols, phenolic resins, vinylphenol polymers; acid anhydrides such as maleic anhydride, succinic anhydride, methyltetrahydrophthalic anhydride, methylnadic anhydride and methylhexahydrophthalic anhydride; and mixtures thereof. Of these, the use of diaminodiphenylsulfone, diaminodiphenylmethane, dicyanodiamide or methylhexahydrophthalic anhydride is particularly preferred. By using the compound (I) with the above curing agent, the resulting cured product exhibits such excellent toughness, heat resistance, rigidity, mechanical strengths and other properties that are not expected from the use of them separately.

Such a synergetic effect is considered to result from a unique structure of the cured product. That is, when an epoxy resin is reacted with the mixed-type curing agent at an elevated temperature, there are formed, at an early stage of the curing, high molecular weight, linear polymers as a result of the reaction of the epoxy resin and the second curing agent having two secondary amino groups, which is considered to contribute to improvement in toughness of the resulting cured product. The hydroxyl groups of the linear polymers thus formed further react, at a later stage of the curing, with the glycidyl groups of the epoxy resin. At the same time, the first curing agent reacts with the epoxy resin. These two cross-linking reactions are considered to contribute to improvement in regidity and mechanical strengths of the cured product. Thus, the curing involves at least the above three types of cross-linking reactions which proceed homogeneously and continuously to give the cured product having complicated cross-linkages and uniform morphology.

The proportion of these two types of curing agents may be arbitrary. Preferably, these two curing agents are used in amounts so that the compound of the formula (I) accounts for 15 to 95%, preferably 25 to 75%, of a total of the amounts of active hydrogen of the two curing agents. The amount of the mixed curing agent is preferably such as to provide a ratio of equivalents of the active hydrogen of the mixed curing agent per equivalent of the epoxy group of the epoxy resin of in the range of 0.6–1.4, more preferably 0.8–1.2.

For preparing the thermocurable composition according to the present invention, the curing agent may be mixed as is or in the form of a solution in a solvent with the Bisphenol A-type epoxy resin. The solvent may be, for example a ketone such as acetone, methyl ethyl ketone or methyl isobutyl ketone; a cellosolve such as methyl cellosolve or ethyl cellosolve; an amide such as dimethyl formamide. The mixing may be performed at room temperature or, to facilitate homogeneous mixing, at elevated temperatures.

If desired, one or more additives may be incorporated into the resin mixtures. Illustrative of such additives are a reactive diluent such as olefin oxide, glycidyl methacrylate, styrene oxide or phenylglycidyl ether, a curing accelerator such as phenol, a tertiary amine, imidazole, a boron trifluoride complex salt, pyrazole or aminotriazole, and a filler such as silica powder, alumina powder, mica or calcium carbonate. Amounts of these additives may generally range up to 15% by weight for the reactive diluent, up to 5% by weight for the curing accelerator, and up to 70% by weight for the filler based on the total weight of the epoxy resin and the curing agent.

The curing is generally performed at temperatures of 100°–140° C. for 1–3 hours. This may be followed, if desired, by a post curing treatment which may be performed at 150°–220° C. for 1–3 hours.

The thermocurable composition according to the present invention can provide a matrix resin, for example, for civil engineering and construction materials, coatings, lining materials, adhesives, molded materials, for electrical appliances (for example, mechanical parts, jigs and tools), fiber reinforced plastic composite materials and the like. The cured, epoxy resin articles obtained using the thermocurable composition of the present invention has excellent heat resistance, modulus, hardness, chemical resistance, toughness, flexibility, rigidity, strength, anti-cracking property, impact strength and rupture strength. It is especially suited as an FRP matrix resin for the production of composite articles with high mechanical strength.

The following examples will further illustrate the present invention.

PREPARATION EXAMPLE 1

In 276 g (1 mole) of diaminodiphenylsulfone (DDS) in 1000 ml of a mixed solvent of water/ethanol (50/50) was charged 284 g (2 moles) of methyl iodide ($CH_3I$), and the mixture was reacted at 60° C. for 2 hours. The resulting crude product was purified by recrystallization with a water/ethanol (50/50) mixed solvent in duplicate.

The resulting product is identified by infrared absorption spectrum (IR) and gel permeation chromatography (GPC) and confirmed to be a pure product of an epoxy resin curing agent (B), the objective product according to the present invention, represented by the following formula:

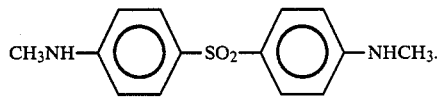

PREPARATION EXAMPLE 2

In 198 g (1 mole) of diaminodiphenylmethane (DDM) in 1000 ml of a mixed solvent of water/ethanol (50/50) was charged 284 g (2 moles) of methyl iodide ($CH_3I$), and the mixture was reacted at 60° C. for 2 hours. The resulting crude product was purified by recrystallization with a water/ethanol (50/50) mixed solvent in duplicate.

The resulting product is identified by IR and GPC and confirmed as a pure product of an epoxy resin curing agent (B), the objective product according to the present invention, represented by the following formula:

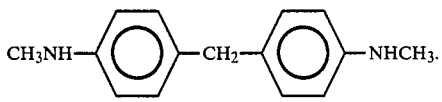

PREPARATION EXAMPLES 3–5

In place of diaminodiphenyl sulfone (DDS) used in Preparation Example 1, the process of Preparation Example 1 was followed in the same manner with the exception to use compounds of the following general formula:

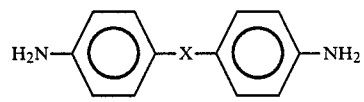

(in which X is —CO—, —S— or —C($CH_3$)$_2$—), yielding the following compounds:

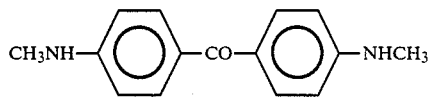

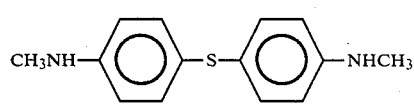

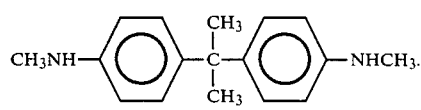

PREPARATION EXAMPLE 6

In place of diaminodiphenylsulfone (DDS) used in Preparation Example 1, the process of Preparation Example 1 was followed in the same manner with the exception to use a compound of the following general formula:

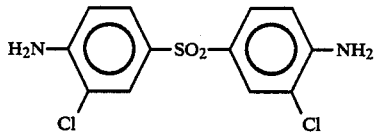

yielding a compound of the formula:

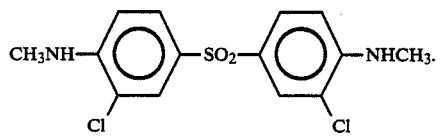

PREPARATION EXAMPLE 7

In a solution of 198 g (1 mole) of N,N-diaminodiphenylmethane (DDM) in 1,000 ml of a water/ethanol (50/50) mixed solvent was charged 312 g (2 moles) of ethyl iodide ($C_2H_5I$), and the mixture was reacted at 60° C. for 3 hours. The resulting crude product was recrystallized twice from a water/ethanol (50/50) mixed solvent.

The resulting reaction product was identified by means of IR and GPC to have the following formula:

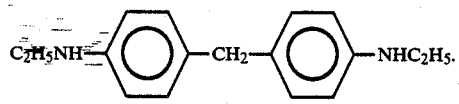

PREPARATION EXAMPLE 8

In place of diaminodiphenylsulfone (DDS) used in Preparation Example 1, the process of Preparation Example 1 was followed in the same manner with the exception to use a compound of the following general formula:

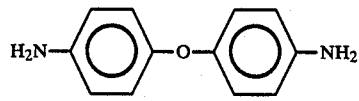

yielding a compound of the formula:

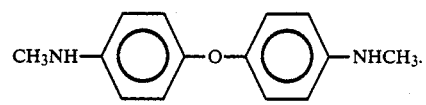

The mixed type curing agent according to the present invention will be described more in detail by way of examples.

EXAMPLE 1

Epoxy resins were blended in amounts shown in Table 1 below and the resulting blend was heated to 150° C. to obtain a homogeneous mixture. After cooling to 80° C., dicyanodiamide was mixed to the mixture in a stoichiometric amount, thereby to obtain a thermocurable composition. The composition was poured into a mold composed of two glass plates spaced apart from each other by a Teflon spacer, heated at 100° C. for 2 hours, and then cured at 200° C. for 2 hours in an oven. The cured product was sliced into test pieces with a size of 30 cm×30 cm×2 mm and the test pieces were subjected tested for Izod strength (IZOD) and glass transition temperature (Tg) to obtain the results summarized in Table 1. A prepreg was also prepared by impregnating carbon fibers (tensile strength: 350 kg/mm$^2$, modulus: 32 t/mm$^2$), arranged in parallel with each other, with the above epoxy resin composition. Workability for the fabrication of the prepreg was good. The prepreg showed the tackiness (TAC) as shown in Table 1. The prepreg was laminated in 12 layers and the laminate was cured under the same conditions as above to obtain carbon fiber-reinforced composite material whose compression after impact (CAI) was as shown in Table 1.

EXAMPLES 2–8

Example 1 was repeated in the same manner as described except the compositions of the epoxy resin blends were changed as shown in Table 1. The results were as summarized in Table 1. The workability for the fabrication of the prepreg was good in the case of Examples 3–6 and 8. The composition of Example 7 is suited for the fabrication of machining parts.

COMPARATIVE EXAMPLES 1–4

Example 1 was repeated in the same manner as described except the compositions of the epoxy resin blends were changed as shown in Table 1. The results were as summarized in Table 1. The toughness is poor in Comparative Examples 1–3. In the case of Comparative Example 4, good prepreg was not obtained.

TABLE 1

| Example | Amount (wt %) Epicoat | | | | | Average molecular weight | Izod (kg · cm/cm$^2$) | Tg (°C.) | CAI (kg/mm$^2$) | TAC* |
| | 828 | 1001 | 1004 | 1007 | 152 | | | | | |
| --- | --- | --- | --- | --- | --- | --- | --- | --- | --- | --- |
| 1 | 28 | 72 | | | | 650 | 3.6 | 121 | 20 | A |
| 2 | 20 | 80 | | | | 707 | 4.5 | 118 | 22 | A |
| 3 | 30 | | 70 | | | 815 | 5.6 | 116 | 23 | B |
| 4 | 20 | 40 | 40 | | | 819 | 5.5 | 118 | 24 | B |
| 5 | 20 | | 80 | | | 974 | 7.2 | 115 | 27 | C |
| 6 | 30 | | | 70 | | 970 | 7.7 | 111 | 27 | C |
| 7 | 20 | | | 80 | | 1247 | 8.2 | 111 | 28 | D |
| 8 | 20 | 60 | | | 20 | 671 | 4.0 | 125 | 20 | B |
| Comp. 1 | 100 | | | | | 380 | 2.2 | 135 | 12 | A |
| Comp. 2 | 50 | 50 | | | | 534 | 2.4 | 120 | 14 | B |
| Comp. 3 | 20 | | 20 | | 60 | 614 | 1.3 | 156 | 11 | A |

TABLE 1-continued

| Example | Amount (wt %) Epicoat | | | | | Average molecular weight | Izod (kg·cm/cm$^2$) | Tg (°C.) | CAI (kg/mm$^2$) | TAC* |
|---|---|---|---|---|---|---|---|---|---|---|
| | 828 | 1001 | 1004 | 1007 | 152 | | | | | |
| Comp. 4 | 15 | | | 85 | | 1454 | 8.3 | 110 | 28 | X |

*TAC (tackiness) is rated as follows:
A: Weak (soft)
B: Excellent
C: Excellent
D: Weak (hard)
X: Very poor (very hard)

EXAMPLE 9

Example 1 was repeated in the same manner as described except that the compound obtained in Preparation Example 2 was used as the curing agent in place of dicyanodiamide. The results are summarized in Table 2.

EXAMPLE 10

Example 1 was repeated in the same manner as described except that the compound obtained in Preparation Example 1 was used as the curing agent in place of dicyanodiamide. The results are summarized in Table 2.

EXAMPLES 11–13

Examples 3, 6 and 8 were repeated in the same manner as described except that the compound obtained in Preparation Example 2 was used as the curing agent in place of dicyanodiamide. The results are summarized in Table 2.

COMPARATIVE EXAMPLES 5 AND 8

Comparative Examples 1 and 4 were repeated in the same manner as described except that, as the curing agent, the compound obtained in Preparation Example 2 was used in place of dicyanodiamide. The results are summarized in Table 2.

COMPARATIVE EXAMPLE 6

Comparative Example 1 was repeated in the same manner as described except that, as the curing agent, the compound obtained in Preparation Example 1 was used in place of dicyanodiamide. The results are summarized in Table 2.

COMPARATIVE EXAMPLE 7

Comparative Exmple 5 was repeated in the same manner as described except that a mixed Bisphenol A-type resin having the composition shown in Table 2 was used. The results are summarized in Table 2.

TABLE 2

| Example | Amount (wt %) Epicoat | | | | | Average molecular weight | Curing Agent (*) | Izod (kg·cm/cm$^2$) | Tg (°C.) | CAI (kg/mm$^2$) | TAC |
|---|---|---|---|---|---|---|---|---|---|---|---|
| | 828 | 1001 | 1004 | 1007 | 152 | | | | | | |
| 9 | 28 | 72 | | | | 650 | (2) | 13.6 | 120 | 44 | A |
| 10 | 28 | 72 | | | | 650 | (1) | 9.5 | 199 | 39 | A |
| 11 | 30 | | 70 | | | 815 | (2) | 15.2 | 115 | 46 | B |
| 12 | 30 | | | 70 | | 970 | (2) | 15.2 | 112 | 48 | C |
| 13 | 20 | | 60 | | 20 | 671 | (2) | 13.8 | 125 | 44 | B |
| Comp. 5 | 100 | | | | | 380 | (2) | 11.2 | 135 | 42 | A |
| Comp. 6 | 100 | | | | | 380 | (1) | 7.0 | 205 | 35 | A |
| Comp. 7 | 70 | 30 | | | | 460 | (2) | 11.8 | 129 | 42 | A |
| Comp. 8 | 15 | | | 85 | | 1454 | (2) | 15.3 | 110 | 48 | X |

(*): The number of Preparation Example.

EXAMPLES 14–21

Example 1 was repeated in the same manner as described except that various mixed curing agents as shown in Table 3 were each used in place of dicyanodiamide. The results were as summarized in Table 3.

EXAMPLES 22–24

Examples 3, 6 and 8 were repeated in the same manner as described except that a mixed curing agent consisting of 28 parts by weight of the compound obtained in Preparation Example 2 and 72 parts by weight of dicyanodiamide was used in place of dicyanodiamide. The results are shown in Table 3.

EXAMPLE 25–28

Example 1 was repeated in the same manner as described except that the curing agent indicated in Table 3 was used in place of dicyanodiamide, thereby to obtain the results summarized in Table 3.

COMPARATIVE EXAMPLE 9

Comparative Example 4 was repeated in the same manner as described except that the mixed curing agent indicated in Table 3 was used in place of dicyanodiamide. The results are shown in Table 3.

TABLE 3

| Example | Amount (wt %) Epicoat | | | | | Average molecular weight | Curing Agent | | | Izod (kg·cm/cm$^2$) | Tg (°C.) | CAI (kg/mm$^2$) | TAC |
|---|---|---|---|---|---|---|---|---|---|---|---|---|---|
| | 828 | 1001 | 1004 | 1007 | 152 | | (A) *1 | (B) *2 | A:B (wt/wt) | | | | |
| 14 | 28 | 72 | | | | 650 | (1) | DDS | 75:25 | 10.5 | 205 | 40 | A |
| 15 | 28 | 72 | | | | 650 | (1) | DDS | 50:50 | 11.3 | 209 | 41 | A |
| 16 | 28 | 72 | | | | 650 | (1) | DDS | 30:70 | 11.0 | 212 | 41 | A |
| 17 | 28 | 72 | | | | 650 | (2) | DDM | 75:25 | 14.7 | 132 | 44 | A |
| 18 | 28 | 72 | | | | 650 | (2) | DDM | 50:50 | 15.5 | 138 | 55 | A |

TABLE 3-continued

| Example | Amount (wt %) Epicoat | | | | | Average molecular weight | Curing Agent | | A:B (wt/wt) | Izod (kg·cm/cm²) | Tg (°C.) | CAI (kg/mm²) | TAC |
| --- | --- | --- | --- | --- | --- | --- | --- | --- | --- | --- | --- | --- | --- |
| | 828 | 1001 | 1004 | 1007 | 152 | | (A) *1 | (B) *2 | | | | | |
| 19 | 28 | 72 | | | | 650 | (2) | DDM | 30:70 | 15.2 | 141 | 52 | A |
| 20 | 28 | 72 | | | | 650 | (1) | DICY | 30:70 | 11.7 | 200 | 42 | A |
| 21 | 28 | 72 | | | | 650 | (2) | DICY | 30:70 | 12.0 | 128 | 46 | A |
| 22 | 30 | | 70 | | | 815 | (2) | DICY | 30:70 | 15.0 | 127 | 55 | B |
| 23 | 30 | | | 70 | | 970 | (2) | DICY | 30:70 | 15.2 | 112 | 56 | C |
| 24 | 20 | 60 | | | 20 | 671 | (2) | DICY | 30:70 | 13.0 | 129 | 46 | C |
| 25 | 28 | 72 | | | | 650 | | DDS | 0:100 | 2.8 | 217 | 14 | A |
| 26 | 28 | 72 | | | | 650 | (1) | DDM | 15:85 | 5.5 | 219 | 25 | A |
| 27 | 28 | 72 | | | | 650 | | DDM | 0:100 | 3.5 | 147 | 16 | A |
| 28 | 28 | 72 | | | | 650 | (2) | DDM | 15:85 | 5.6 | 145 | 20 | A |
| Comp. 9 | 15 | 85 | | | | 1454 | (2) | DICY | 30:70 | 15.5 | 110 | 56 | E |

*1: The number of Preparation Example
*2: DDS: diaminodiphenylsulfone, DDM: N,N—diaminodiphenylmethane, DICY: dicyanodiamide

What is claimed is:

1. A thermocurable composition comprising:
a mixture of bisphenol A epoxy resins which have a number average molecular weight of 650–1300, wherein 10–40% by weight of said mixture consists of one or more bisphenol A epoxy resins having an epoxy equivalent weight of 180–195; and
at least one curing agent represented by the formula:

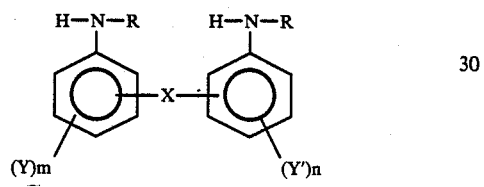

wherein X is $-CR_1R_2-$, $-CO-$, $-COO-$, $-SO_2-$, $-SO-$, $-S-$, $-O-$, $-NR_1-$, $-SiR_1R_2-$ or $POR_1-$ where $R_1$ and $R_2$ each stand for hydrogen, a lower alkyl or a phenyl; Y and Y' each stand for hydrogen, a lower alkyl or an electron attractive group; R is a lower alkyl; and m and n are each an integer of 1–4.

2. A thermocurable composition as set forth in claim 1, wherein said bisphenol A epoxy resins have a number average molecular weight of 650–1000, and wherein 10–30% by weight of said mixture consists of one or more epoxy resins having an epoxy equivalent weight of 180–195.

3. A thermocouple composition as set forth in claim 1, further comprising an additional epoxy resin, other than a bisphenol A epoxy resin, in an amount 50% by weight or less based on the total weight of said bisphenol A epoxy resin and said additional epoxy resin.

4. A thermocurable composition as set forth in claim 1, wherein said bisphenol A resin mixture is a blend of a first bisphenol A epoxy resin having an epoxy equivalent weight in the range of 180–195 and a second bisphenol A epoxy resin having an epoxy equivalent weight of greater than 195, the amount and the molecular weight of said second epoxy resin being such that said first epoxy resin is 10–40 weight % of said blend and such that the number average molecular weight of said blend is 650–1300.

5. A thermocurable composition as set forth in claim 1, wherein R is an alkyl having 1–3 carbon atoms, X is $-CH_2-$, $-SO_2-$, $-CO-$, $-O-$, $-C(CH_3)_2-$ or $-CHC_6H_5-$, Y and Y' each is hydrogen, a lower alkyl, a halogen, a nitro group or trifluoromethyl, $R_1$ and $R_2$ each is an alkyl having 1–3 carbon atoms, and m and n each is 1 or 2.

6. A thermocurable composition comprising:
a mixture of bisphenol A epoxy resins which have a number average molecular weight of 650–1300, wherein 10–40% by weight of said mixture consists of one or more bisphenol A epoxy resins having an epoxy equivalent weight of 180–195; and
a curing agent comprising a first element which is at least one member selected from primary amines, phenolic compounds and acid anhydrides, and a second element which is at least one compound represented by the following general formula:

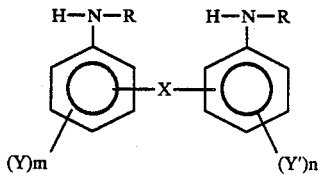

wherein X is $-CR_1R_2-$, $-CO-$, $-COO-$, $-SO_2-$, $-SO-$, $-S-$, $-O-$, $-NR_1-$, $-SiR_1R_2-$ or $POR_1-$ where $R_1$ and $R_2$ each stand for hydrogen, a lower alkyl or a phenyl; Y and Y' each stand for hydrogen, a lower alkyl or an electron attractive group; R is a lower alkyl; and m and n are each an integer of 1–4.

7. A thermocurable composition as set forth in claim 6, wherein said first and second elements are used in amounts so that said first and second elements account for 85 to 5% and 15 to 95%, respectively, of a total of the amounts of active hydrogen of said first and second elements.

8. A thermocurable composition as set forth in claim 6, wherein said first element is at least one member selected from aliphatic primary amines, aromatic primary amines, polyamido primary amines, dicyanpolyamides, bisphenols, phenolic resins, vinylphenol polymers, maleic anhydride, succininc anhydride, methyltetrahydrophthalic anhydride, methylnadic anhydride and methylhexahydrophthalic anhydride.

9. A thermocurable composition as set forth in claim 8, wherein wherein said first element is diaminodiphenyl sulfone, diaminodiphenyl methane, dicyandiamide or methylhexahydrophthalic anhydride.

10. A thermocurable composition as set forth in claim 6, wherein R is an alkyl having 1–3 carbon atoms, X is $-CH_2-$, $-SO_2-$, $-CO-$, $-O-$, $-C(CH_3)_2-$ or $-CHC_6H_5-$, Y and Y' each is hydrogen, a lower alkyl, a halogen, a nitro group or trifluoromethyl, $R_1$ and $R_2$ each is an alkyl having 1-3 carbon atoms, and m and n each is 1 or 2.

11. A thermocurable composition as set forth in claim 6, wherein the curing agent is used in an amount providing a ratio of equivalents of the active hydrogen of the curing agent per equivalent of the epoxy group of the epoxy resin of in the range of 0.6-1.4.

* * * * *

UNITED STATES PATENT AND TRADEMARK OFFICE
CERTIFICATE OF CORRECTION

PATENT NO. : 4,912,179
DATED : March 27, 1990
INVENTOR(S) : MURAKAMI et al

It is certified that error appears in the above-identified patent and that said Letters Patent is hereby corrected as shown below:

Col. 1, line 11, "reistance" should read --resistance--.

Col. 2, line 20, "fail" should read --fails--.

Col. 4, line 1, "trimetllitate" should read --trimellitate--;
      line 7, "dicyanodiaminde" should read --dicyanodiamide--;
      line 30, "dicyanodiaminde" should read -- dicyandiamide--.
      line 59, after "tive" insert --of--; and
      line 59, "forl-" should read --fol- --.

Col. 12, line 14, "Exmple" should read --Example--.

Col. 13, line 49, "thermocouple" should read --thermocurable--.

Signed and Sealed this

Tenth Day of September, 1991

*Attest:*

HARRY F. MANBECK, JR.

*Attesting Officer*

*Commissioner of Patents and Trademarks*